(12) United States Patent
Delaney et al.

(10) Patent No.: US 7,153,214 B2
(45) Date of Patent: Dec. 26, 2006

(54) UNIVERSAL JOINT

(75) Inventors: Dana L. Delaney, York, PA (US); Bruce Dexter, South Windsor, CT (US); Awad Gharib, Cockeysville, MD (US)

(73) Assignee: Easco Hand Tools, Inc., Simsbury, CT (US)

( * ) Notice: Subject to any disclaimer, the term of this patent is extended or adjusted under 35 U.S.C. 154(b) by 0 days.

(21) Appl. No.: 11/064,488

(22) Filed: Feb. 23, 2005

(65) Prior Publication Data

US 2005/0143179 A1   Jun. 30, 2005

Related U.S. Application Data

(62) Division of application No. 10/326,662, filed on Dec. 19, 2002, now Pat. No. 6,869,366.

(51) Int. Cl.
*F16D 3/18*   (2006.01)
(52) U.S. Cl. ................ 464/159; 464/901; 81/177.85
(58) Field of Classification Search .............. 464/151, 464/153, 154, 158, 159, 901; 403/375, 332, 403/13, 359.1, 359.5, 359.6, 383; 279/16; 81/177.75, 177.85
See application file for complete search history.

(56) References Cited

U.S. PATENT DOCUMENTS

| | | | | |
|---|---|---|---|---|
| 442,710 | A | * | 12/1890 | Marsh .................. 81/177.85 X |
| 741,106 | A | | 10/1903 | Burdick |
| 2,441,347 | A | | 5/1948 | Dodge |
| 3,222,096 | A | * | 12/1965 | Kaman .................... 403/383 X |
| 4,188,801 | A | | 2/1980 | Hugh et al. |
| 4,312,193 | A | | 1/1982 | Gibbs et al. |
| 4,818,157 | A | * | 4/1989 | Kouvelis |
| 4,824,418 | A | | 4/1989 | Taubert ....................... 464/159 |
| 5,007,880 | A | | 4/1991 | Walker et al. .............. 464/159 |
| 5,291,809 | A | * | 3/1994 | Fox et al. ................. 81/177.85 |
| 5,851,151 | A | | 12/1998 | Reynolds ..................... 464/106 |
| 5,918,512 | A | * | 7/1999 | Habermehl et al. .. 81/177.75 X |
| 6,152,826 | A | | 11/2000 | Profeta et al. .............. 464/159 |
| 6,582,151 | B1 | * | 6/2003 | Hopson ................... 403/359.5 |
| 6,659,997 | B1 | * | 12/2003 | Casutt ................. 81/177.85 X |
| 6,698,320 | B1 | * | 3/2004 | Hu |
| 6,709,234 | B1 | * | 3/2004 | Gilbert et al. .......... 403/383 X |
| 2004/0214646 | A1 | * | 10/2004 | Chiou ........................ 464/158 |

FOREIGN PATENT DOCUMENTS

| | | | |
|---|---|---|---|
| DE | 1172488 | 8/1964 | ................. 464/159 |
| EP | 362 381 A1 | 2/1988 | |
| GB | 235081 | 6/1925 | ................. 464/106 |

OTHER PUBLICATIONS

International Search Report dated Dec. 17, 2004; PCT/US03/40517.
European Search Report dated Jan. 4, 2006 for PCT/US0340517.

* cited by examiner

*Primary Examiner*—Greg Binda
(74) *Attorney, Agent, or Firm*—Nelson, Mullins, Riley & Scarborough, L.L.P.

(57) ABSTRACT

A universal joint to transmit force from a tool to a workpiece. A driver attachable to the tool has a spherical cavity. A plurality of inwardly facing protrusions is formed in the cavity. Each protrusion has a pair of conical sidewalls separated by an angled ramp. A driven socket has a sphere formed on one end. The sphere has a plurality of channels. The sphere is received in the spherical cavity in the driver and the protrusions in the cavity are received in the channels. The drive webs forming the channel engage the protrusions when the driver is angularly offset from the driven socket.

9 Claims, 8 Drawing Sheets

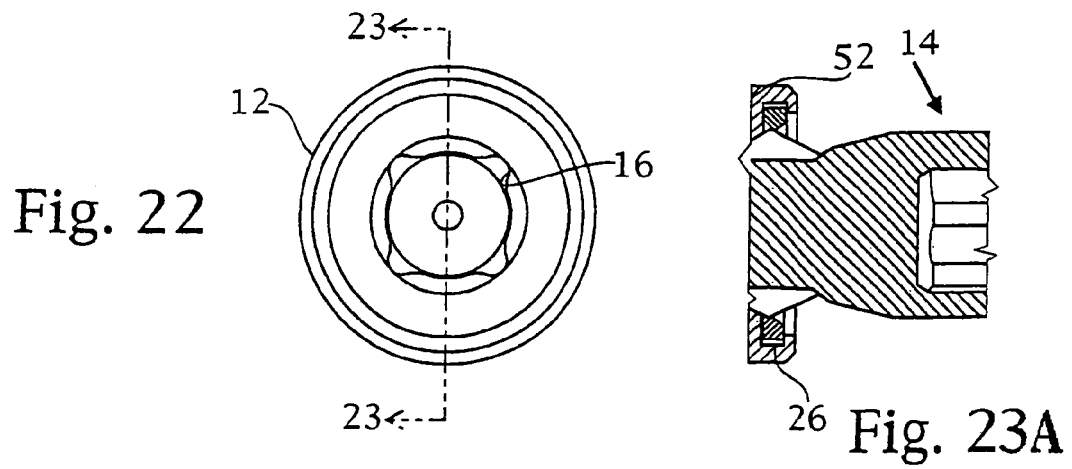
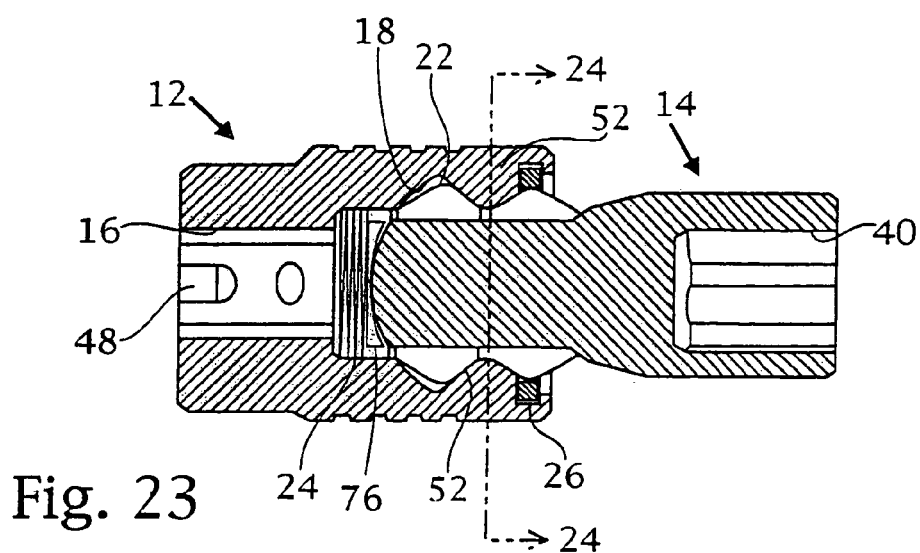
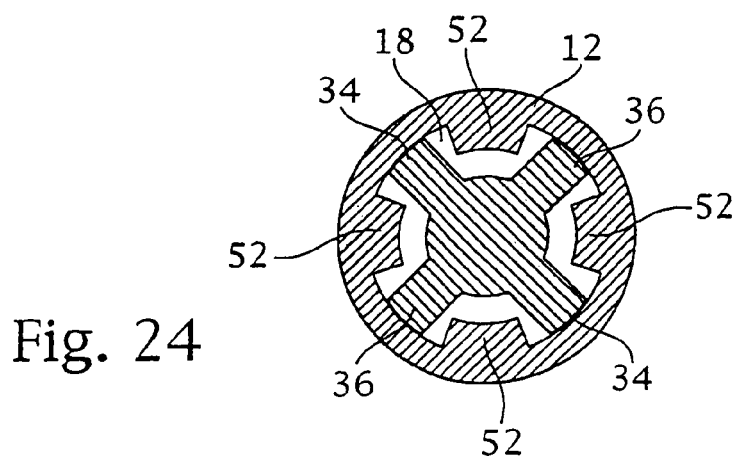

UNIVERSAL JOINT

CLAIM OF PRIORITY

The present application is a divisional patent application of U.S. patent application Ser. No. 10/326,662, filed Dec. 19, 2002, which issued as U.S. Pat. No. 6,869,366 on Mar. 22, 2005, the entire disclosure of which is hereby incorporated by reference in its entirety.

BACKGROUND OF THE INVENTION

1. Field of the Invention

The present invention relates to a universal joint, and more particularly to a universal joint which may be used with a power of manually-operated tool to deliver force in an offset manner to a fastener or other workpiece.

2. Description of Prior Art

The universal joint makes access possible where straight access (0° offset) is difficult or impossible. A very common use of such a device is removing and replacing difficult to access fasteners on an automobile. The universal joint must transmit a primarily rotational force imparted by a manual or power driver to a socket or drive tang through a variable range of angular offset. Additionally, the universal joint must hold its position against gravity to allow ease of placement.

Typically the universal joint design has used a "pin and ball" design as the common design (U.S. Pat. No. 2,441, 1347 to Dodge). The "pin and ball" design the impact load is transmitted via the shear and bearing strength of the pin and ball. The failure mode of this device is typically the shearing of the pin with an occasional neck failure. Additionally the bearing area where the pin contacts the slot within the ball becomes deformed because of the great amount of force and lack of material support. The deformation of the ball results in premature binding of the joint. The friction device of this design is typically a conical coil spring that loses its force through repeated over-compression during use.

A more recent design (described in U.S. Pat. No. 4,188, 801, Hugh et al) uses a quadrified ball in a square socket. Hugh et al design doesn't have the shear problem of the "pin and ball" design. However, it has to be larger than competing products which limits its usefulness and has a movability issue. The large size is the result of how torque and impact forces are transmitted in a largely radial manner extending outward and thereby requiring significant material thickness to support a given torque or impact event. Movability of this configuration is not smooth near its full deflection angel when the product is new. After a few impact cycles the movement of this joint becomes worse since the corners of the quadrified ball become deformed and begin binding on the interior of the square and the retaining ring.

In U.S. Pat. No. 4,824,418 Taubert discloses an articulated joint for coupling shafts that pivot with respect to each other. The joint has a cylindrical hollow drive element and a spherical drive element. The hollow drive element is shaped like a hollow cylinder with a wavy inner profiling and the spherical drive element has a spherical shape with a wavy profiling complementary thereto. Even on pivoting the shafts with respect to one another, there is a positive connection and a reliable force transfer during rotation. No lugs are disclosed in the hollow drive element.

A quadrified ball is formed on a driven member received in a cavity in a driving member as disclosed by Reynolds in U.S. Pat. No. 5,851,151. The quadrified ball rests on a plug tension washer which contacts the head of the ball and presses the ball against a C spring. A polymeric member is adjacent to the ball.

In U.S. Pat. No. 6,152,826 Profeta describes a product that is " . . . substantially a sphere with spaced-apart lugs extending outwardly, formed around a circumference of the sphere.". These lugs interact with "channels" to drive the mating component. The Profeta design addresses many of the issues found in Dodge and in Hugh et al; i.e., there is no single pin to shear or slot to weaken the ball as in Dodge and unlike Hugh et al the forces are primarily tangential which allows for a smaller more useful outer diameter of product.

However, the Profeta design is incapable of achieving a competitive angle of motion while maintaining required strength and assembly integrity. The possible range of motion (angular offset) in this product is proportional to the ratio of sphere diameter to neck diameter. Therefore, for greater angular deflection, it is required to increase the sphere diameter or decrease the neck diameter. The maximum spherical diameter is limited by the minimum length of lugs that extend outward from the sphere, minimum outer wall thickness and maximum outer diameter of the mating part. The minimum neck diameter is limited by strength requirements. Assembly integrity is associated with how and where the sphere is contained within the assembly.

If the neck were made large enough to enable competitive torque strength while maintaining an acceptable overall size, then the angle of deflection would be insufficient to be competitive. If range of motion were made competitive, then torque strength would suffer. Attempts to bring both range of motion and torque strength to competitive standards results in insufficient spherical contact to insure a reliable assembly.

BRIEF SUMMARY OF THE INVENTION

An object of the present invention is to provide a universal joint to transmit a rotational impact event from a tool to a workpiece while allowing the tool and workpiece to be misaligned by an angle exceeding 27°.

A further object of the present invention is to increase the size of the driven sphere and to increase the size of the neck to provide a device having increased shear strength.

Another object of the present invention is to provide an impact universal joint with an extended range of motion, long life, smooth operation and reliable assembly.

Yet another object of the present invention is to provide a means for securing the tool to the driver of the universal joint.

A still further object of the present invention is to protect the spring on the universal joint to reduce wear.

Still another object of the present invention is to provide a universal joint that is easier to install on a conventional impact wrench than is presently available.

In accordance with the teachings of the present invention, there is disclosed a universal joint to transmit force from a tool to a workpiece. A driver is attachable to the tool, the driver having a cavity formed therein. A plurality of equi-spaced apart inwardly extending protrusions are disposed circumferentially and approximately equatorially within the cavity about a central axis. A driven socket has a first end and an opposite second end. The first end has means thereon to drive the workpiece. The second end is spherical and disposed on the central axis. A neck formed between the first end and the second end about the central axis. The second end has a plurality of spaced-apart channels, each channel being parallel to the central axis. Each channel is formed from a first drive web and a second drive web, each connected angularly to a drive shank within the respective channel. A plurality of drive webs are alternately disposed forming the plurality of channels. The plurality of channels equal the plurality of spaced-apart protrusions in the driver. The second end of the driver socket is received in the cavity in the driver. Each protrusion within the cavity has a pair of separated conical sidewalls. Each sidewall has a decreasing radius as the protrusion extends toward the central axis of the driver. An angled ramp separates the pair of conical sidewalls. A crown radius is formed at the top of the ramp. The conical sidewalls of the protrusions provide a tangential contact area for the channels of the spherical second end of the driven socket.

In further accordance with the teachings of the present invention there is disclosed a universal joint to transmit force from a tool to a workpiece. A driver is attachable to a tool, the driver having a cavity formed therein. A driven socket has a first end and a second end, the first end having means thereon to drive the workpiece. The second end is spherical and has a plurality of spaced-apart channels and drive webs formed thereon along the central axis. The cavity has a plurality of equi-spaced apart inwardly extending protrusions formed circumferentially and approximately equatorially thereon about the central axis. Each protrusion has a pair of separated conical sidewalls. Each sidewall has a decreasing radius as the protrusion extends toward the central axis of the driver. An angled ramp separates the pairs of conical sidewalls. A crown radius is formed at the top of the ramp. Angled flat surfaces are formed at opposite ends of each conical surface adjacent to each angled ramp. The second spherical end of the driven socket is received in the cavity, wherein the protrusions in the cavity are disposed in corresponding channels in the second spherical end. The conical sidewalls of the protrusions provide a tangential contact area for the channels of the spherical second end such that the driver and the driven socket may be disposed at an angular offset with respect to one another and force is transmitted to the workpiece from the tool.

In still further accordance with the teachings of the present invention, there is disclosed an impact universal joint to transmit force to a workpiece from a tool. A driver is attached to the tool, the driver having a cavity formed therein. A plurality of equi-spaced apart inwardly extending protrusions is disposed circumferentially within the cavity about a central axis. An annular groove is formed in the cavity outwardly of the protrusions. The annular groove has an outer wall parallel to the central axis and two sidewalls, each sidewall being normal to the central axis. A driven socket has a first end having means thereon to drive the workpiece and an opposite second end. The second end is spherical and has a plurality of channel formed thereon. The spherical end is received in the cavity. The plurality of protrusions in the driver cooperates with the plurality of channels on the spherical end of the driven socket. A retaining ring is received in the annular groove in the cavity retaining the spherical second end of the driver socket in the cavity in the driver. The retaining ring has a flat exterior surface bearing against the outer wall of the annular groove. The retaining ring has two parallel thrust flat surfaces. The thrust flat surfaces are separated by the flat exterior surface. The thrust flat surfaces bear against the respective sidewalls of the annular groove. The retaining ring has two symmetrical angled interior flat surfaces opposite from the flat exterior surface. The interior flat surfaces bear against the spherical second end of the driven socket. In this manner, maximum surface contact is maintained between the retaining ring and the annular groove.

These and other objects of the present invention will become apparent from a reading of the following specification taken in conjunction with the enclosed drawings.

BRIEF DESCRIPTION OF THE DRAWINGS

FIG. 22 is an end view of the driver connected to the driven socket;

FIG. 23 is a cross-sectional view taken across the lines 23—23 of FIG. 22;

FIG. 23A is a partial cross sectional view of the driver connected to a driven socket;

FIG. 24 is a cross-sectional view taken across the lines 24—24 of FIG. 23;

DESCRIPTION OF THE PREFERRED EMBODIMENT

Figure 2:
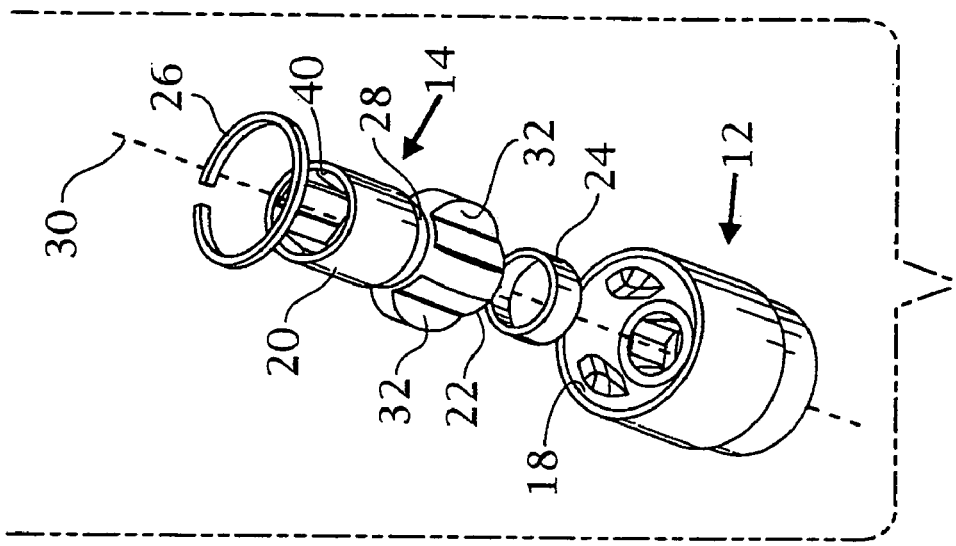
FIG. 2 is a perspective view of the universal joint of the present invention shown from the driven socket toward the driver.
Figure 1:
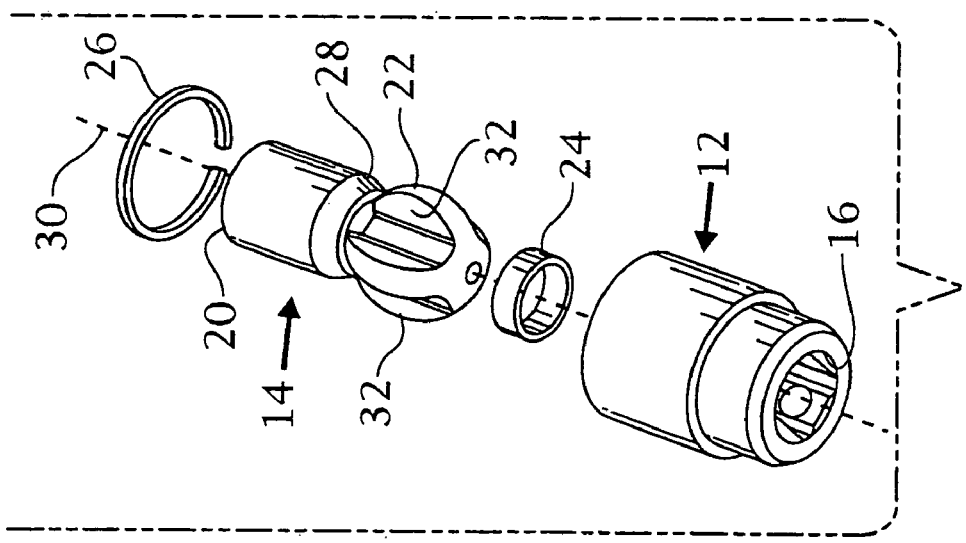
FIG. 1 is a perspective view of the universal joint of the present invention shown from the driver toward the driven socket.
Figure 3:
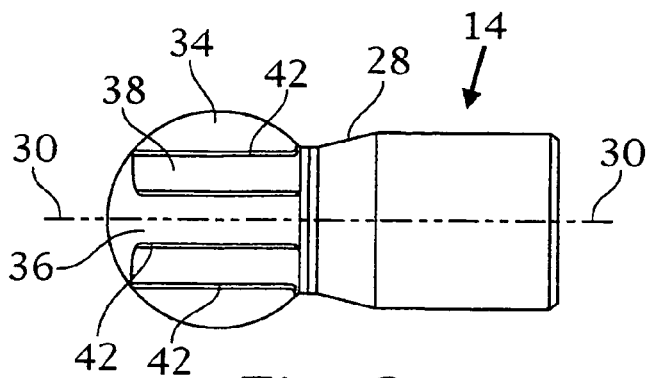
FIG. 3 is a top plan view of the driven socket.
Figure 4:
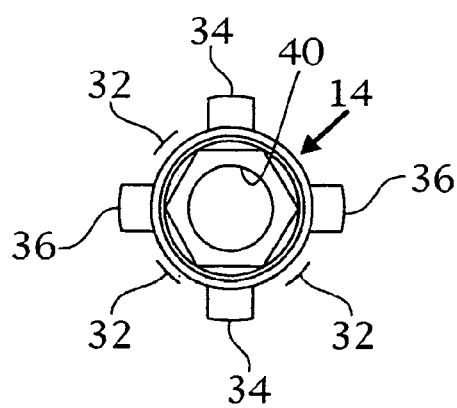
FIG. 4 is a view of the first end of the driven socket.
Figure 5:
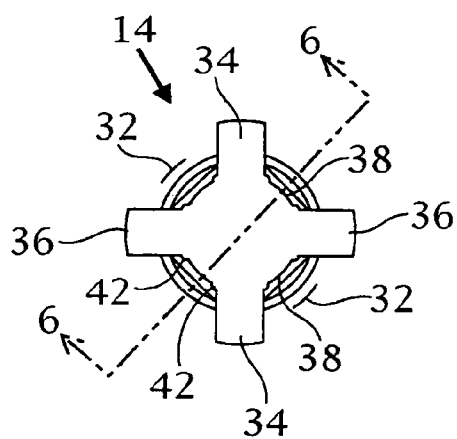
FIG. 5 is a view of the second end of the driven socket.
Figure 6:
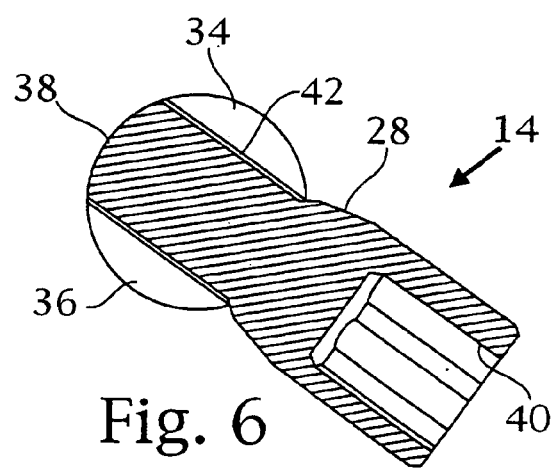
FIG. 6 is a cross-sectional view taken across the lines 6—6 of FIG. 5.

As shown in FIGS. 1 and 2, the universal joint 10 of the present invention has a driver 12 which is attachable to a tool such as an impact wrench. The attachment of the tool may be a socket or square drive recess 16 formed on one end of the driver 12. On an opposite end of the driver 12, there is a cavity 18, which preferably is spherical. A driven socket 14 has a body on a first end 20 and a spherical second end 22. A neck 28 is formed between the first end 20 and the second end 22 about a central axis 30. The spherical second end 22 is received in the cavity 18 as will be described. The assembly also contains a spring 24 that pushes against the spherical second end 22 to impart frictional forces to maintain relative position between the sphere 22 and the exit from the spherical cavity 18. The ring 26 is received in a groove 62 as will be described.

As shown in FIGS. 3–6, the second end 22 of the driven socket 14 is substantially spherical with a plurality of space-apart channels 32 parallel to the central axis 30 of the driven socket 14. Each channel 32 is formed from three principal flat surfaces. A first drive web 34 and second drive web 36 are connected angularly to a drive shank 38 within each channel 32. The drive shanks 38, which are between the other two channel surfaces in each of the channels, together form a polygonal shaft about the central axis 30 of the driven socket 14. The drive webs 34, 36 transmit impact from protrusions on the driver 12 to the drive shank as will be described. The surfaces of the first drive web 34 and the second drive web 36 are facing one another across the respective channel 32. These surfaces create the impact receiving surfaces which form the sides of the respective webs, forming the channel 32. The impact receiving surfaces on either side of a given drive web are parallel to each other and are offset an equal distance from the central axis 30. The surface of the respective first and second drive webs 34, 36 distal from the drive shank 38, form the surface of the spherical second end 22. It is the surface about which frictionally resisted rotation is accomplished.

At the intersection of each drive web 34, 36 and the drive shank 38 therebetween, there are formed fillets 42. These fillets 42 provide additional strength to the driven socket 14 and distribute the load more evenly.

An opening 40 may be formed in the first end 20 of the driven socket 14 distal from the spherical second end 22. The opening 40 may engage a workpiece such as a fastener and impact rotational forces upon the workpiece. Alternately, a drive tang (not shown) may be formed on the first end 20 of the driven socket 14 distal from the spherical second end 22. The tang may be used to connect the driven socket 14 to other workpieces such as sockets and extensions.

Figure 7:
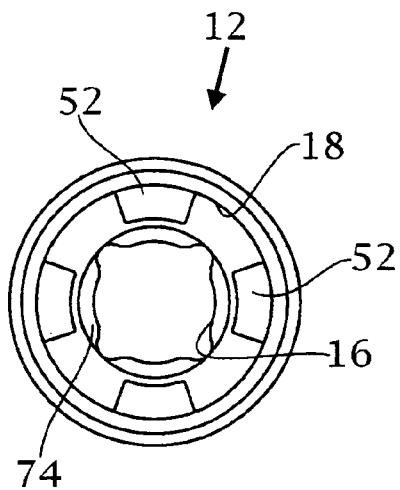
FIG. 7 is a view of the first end of the driver.
Figure 8:
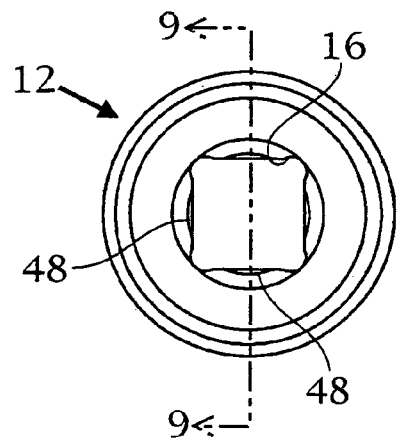
FIG. 8 is a view of the second end of the driver.
Figure 9:
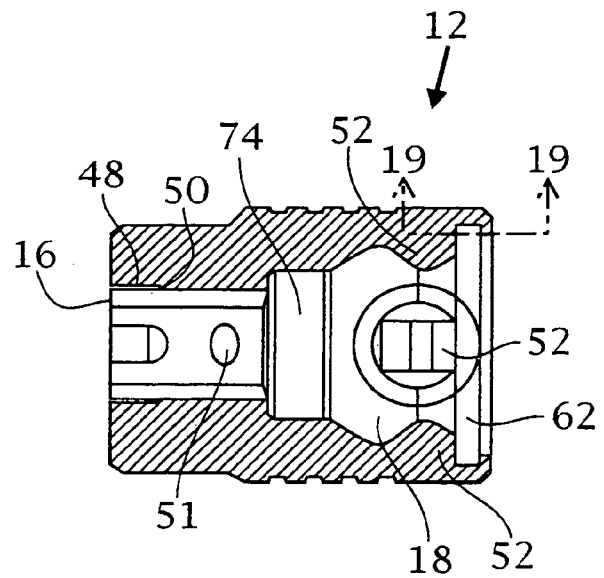
FIG. 9 is a cross-sectional view taken across the lines 9—9 of FIG. 8.
Figure 10:
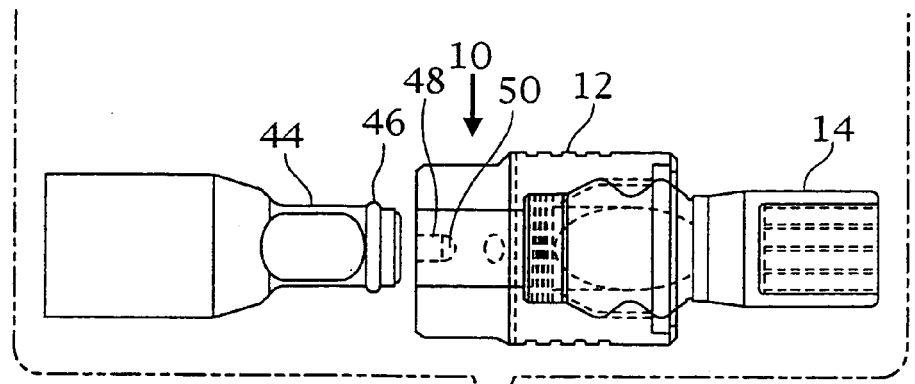
FIG. 10 is a top plan view showing the driver of the universal joint being attached to a tang on a tool such as an impact wrench.
Figure 11:
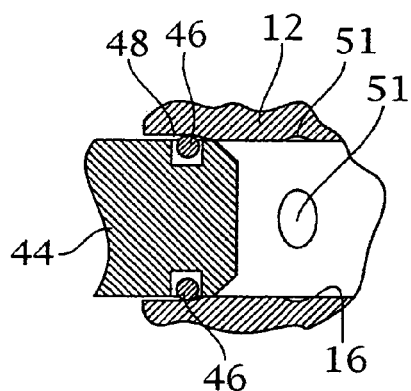
FIG. 11 is an enlarged cross-sectional view showing the C-ring on the tang in the counterbore in the square recess in the driver.

As shown on FIGS. 7–9, the driver 12 of the universal joint 10 has two principal cavities distal from one another within its cylindrical body. One cavity, a square drive recess 16, receives the square drive tang 44 of an impact wrench or similar tool while the other cavity 18, a spherical recess receives and holds the spherical second end 22 of the driven socket 14.

Figure 12:
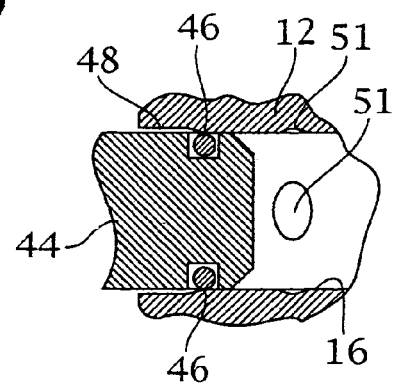
FIG. 12 is an enlarged cross-sectional view showing the C-ring on the tang being compressed by the taper in the square recess in the driver.
Figure 13:
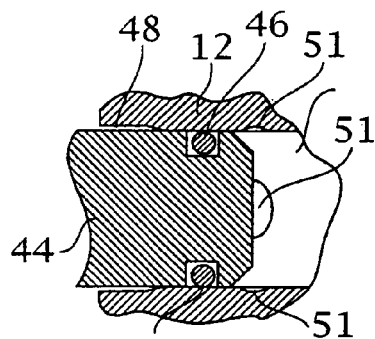
FIG. 13 is an enlarged cross-sectional view showing the C-ring on the tang fully compressed.
Figure 14:
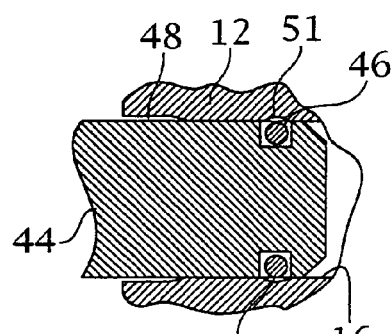
FIG. 14 is an enlarged cross-sectional view showing the C-ring on the tang expanded in the annular recess in the square recess in the driver.
Figure 15:
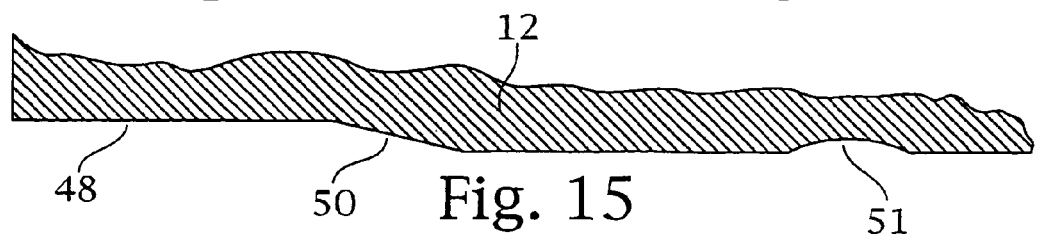
FIG. 15 is an enlarged view of a portion of FIG. 14 showing the counterbore, tapered segment and partial groove.
Figure 16:
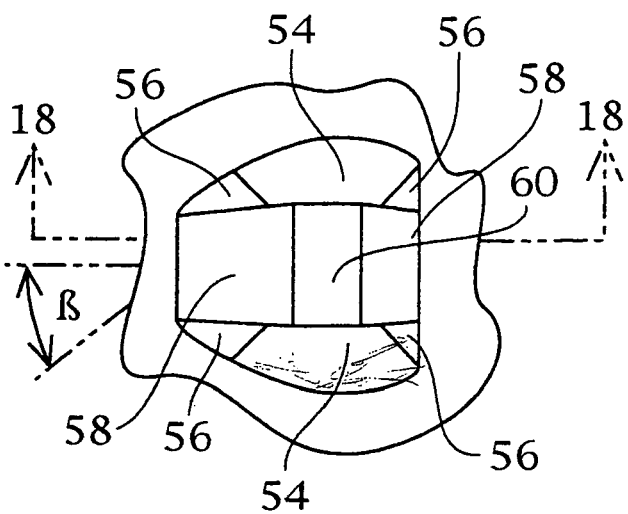
FIG. 16 is an enlarged top plan view of the protrusion.

As shown in FIGS. 8–16, the square drive recess 16, unlike the prior art, has a counterbore 48 extending for a portion of the length of the square drive recess 16. The counterbore 48 preferably is not fully annular in the square drive recess 16 and is the same size or slightly larger than the diameter of the typical C-ring 46 (used on the end of the drive tang 44 to be inserted into the square drive recess 16). Thus, the counterbore 48 has a diameter large enough to cut into the four flat sidewalls of the square drive recess 16 but does not extend fully into the corners where the sidewalls meet. Before experiencing resistance from the C-ring 46 (FIG. 11) distal from the entrance to the square drive recess 16 and near the internal end of the counterbore 48, there is a tapered portion 50 which compresses the C-ring 46 (FIG. 12). With further insertion of the tang 44 into the square drive recess 16, the C-ring 46 is compressed within an annular groove on the tang 44 and the outer circumference of the C-ring frictionally engages the inner wall of the square drive recess 16 (FIG. 13). A partial groove 51 is formed within the square drive recess 16 inwardly of the tapered portion 50 on the four sidewalls but not in the corners where the sidewalls meet. When the tang 44 and C-ring 46 are fully inserted, the C-ring is received in the partial groove 51 and expands slightly to securely connect the drive tang 44 to the driver 12 (FIG. 14). FIG. 15 is a highly enlarged view of one of the faces of the square drive recess 16 which shows the counterbore 48, tapered portion 50 and partial groove 51.

The cavity 18 has a large spherical bearing surface (FIG. 7, 9, 16–18). The cavity 18 is approximately the same size and shape as the spherical second end. 22 of the driven socket 14.

Figure 17:
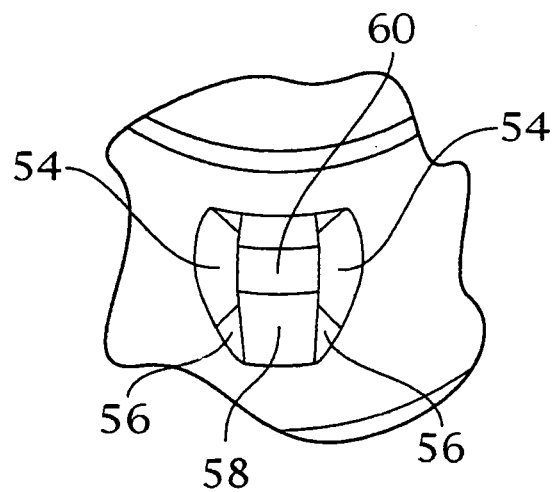
FIG. 17 is a front elevation view of the protrusion.
Figure 18:
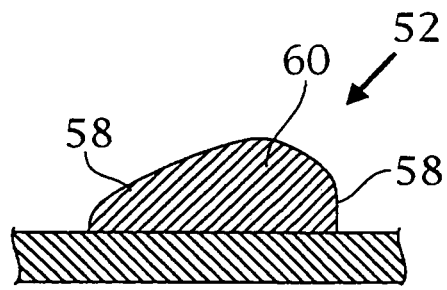
FIG. 18 is a cross-sectional view taken across the lines 18—18 of FIG. 16.
Figure 19:
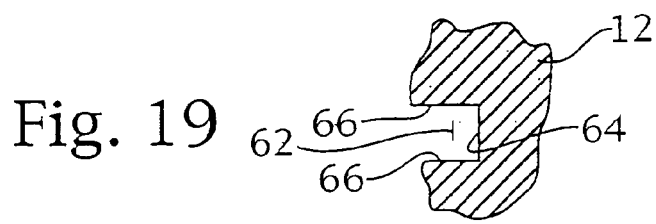
FIG. 19 is a cross-sectional view taken across the lines 19—19 of FIG. 16.
Figure 20:
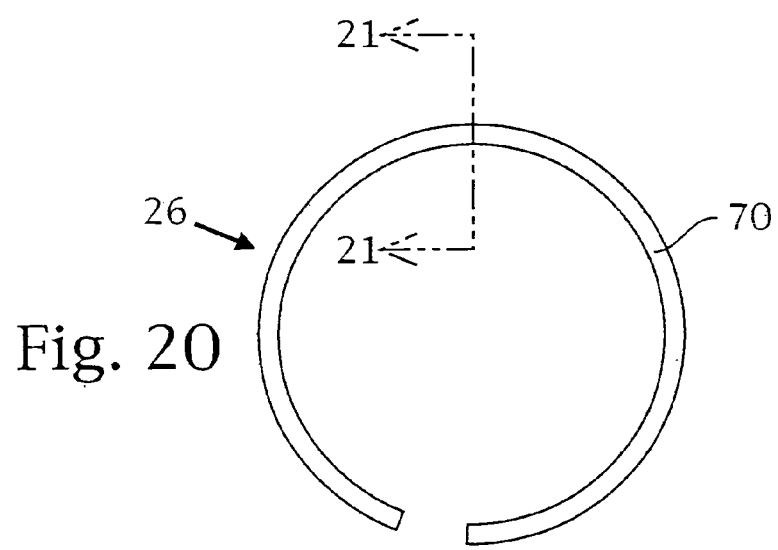
FIG. 20 is a top plan view of the retaining ring.

Located near the "equator" of the spherical cavity 18, and circumferentially thereon, is a plurality of equally space-apart drive protrusions 52 that extend inwardly from the spherical cavity 18 towards the central axis 30. The number of drive protrusions 52 is equal to the number of channels 32 in the mating spherical second end 22 of the driven socket 14. The particular geometry of these protrusions 52 makes them unique and function exceptionally well. Each drive protrusion 52 has two conical sidewalls 54 that decrease in radius as the protrusion 52 extends inwardly towards the central axis 30. Conversely, the radius of the sidewalls 54 are largest when further away from the central axis 30. Therefore, the greatest cross section is near where the sidewalls 54 join the spherical cavity 18, and thus have the greatest strength where it is most effective. The conical shape allows the essentially flat sidewalls of the drive webs 34, 36 of the channels 32 in the sphere 22 to bear against the drive protrusions 52 from any angle. In addition, on opposite sides of each conical sidewall 54 of the drive protrusions 52, angled flat surfaces 56 add to the available bearing surface area and cross-sectional shear area of the driving protrusions 52. The angled flat sections 56 are arranged in such a manner as to be approximately coincident with a contacting drive web surface 34, 36 of the channels when the sphere 22 is at intended maximum angular deflection. An offset ramp 58 on the driving protrusion 52 provides clearance from the drive shank 38 for angular offset. The angle of the ramp 56 is approximately the same or slightly greater than the intended maximum angular offset of the assembly. The drive protrusion 52 culminates in a crown radius 60, which facilitates manufacturing and strengthens the "tip" of the protrusion 52 compared to if the protrusion came to a sharp point that would more easily deform and dent the flat sidewalls of the driven channels 32 of the sphere 22. The surfaces of the offset ramp 58 and crown radius 60 as shown in FIG. 17, may be slightly convex, straight or slightly concave with a very little change in function. FIGS. 15–28 show the surfaces as slightly convex with radius of curvature equal to the distance from the central axis 30. The offset ramp 58 is disposed between the sidewalls 54 of each drive protrusion 52. The maximum offset angle B is shown on FIG. 16. The cavity 18 may be cylindrical rather than spherical.

An annular groove 62 is formed in the cavity 18 in the driver 12 outwardly of the protrusion 52 The annular groove 62 is substantially rectangular having an outer wall 64 and two sidewalls 66 (FIGS. 7–9).

Figures 21, 21A:
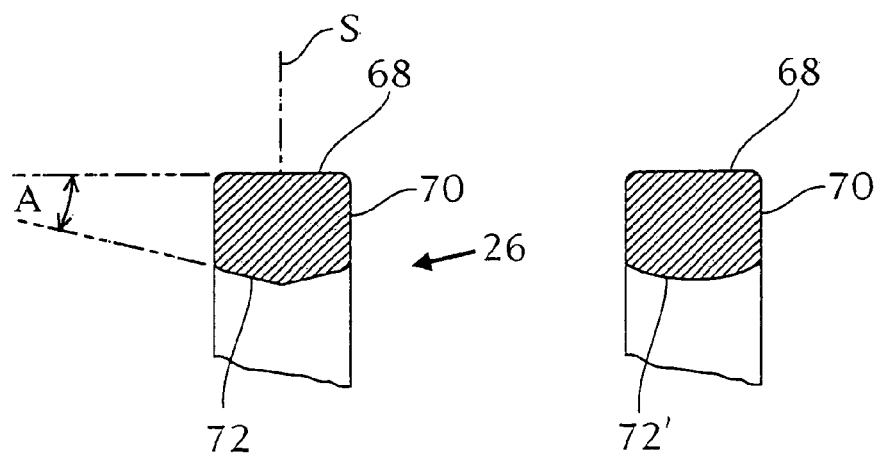
FIG. 21 is a cross-sectional view taken across the lines 21—21 of FIG. 20.
FIG. 21A is a cross-sectional view of an alternate embodiment of a retaining ring.

A retaining ring 26 (FIGS. 16–28) is received in the annular groove 62. The retaining ring's 26 cross-section makes it uniquely suited to withstand the rigors of the impact environment. The cross section has three primary surfaces that function together to minimize space while maximizing strength. The exterior flat 68 is parallel to the central axis 30 about which the cross section is "revolved" while the two thrust flat surfaces 70 are normal to the axis 30. The interior flat surface 72 is formed at an angle A equal to the tangent of the spherical surface of the sphere 22 (at mean diameter) at a point coincident with midway of the interior flat surface 72. In other words, with the sphere 22 at mean diameter and the retaining ring 26 and groove 62 at mean dimensions, the sphere 22 should contact the interior flat surface 72 at a point midway in the interior flat surface 72. There are two interior flat surfaces 72 that are formed about a line of symmetry in order to aid assembly and eliminate the need to orient the retaining ring 26 before assembly. The purpose of the exterior flat surface 68 and the interior flat surfaces 72 is to increase the surface area to resist deformation better than a simple round cross section. The thrust flat surfaces 70 exist to enable the use of a much shallower retaining groove than is possible with a round cross section A round cross section would require the retaining groove to be equal to or greater than the wire radius. Alternately, the retaining ring 26 may have an outwardly curved surface 72' in place of the two flat surfaces 72. The ring 26 would have a "D" shape (FIG. 21A).

A counterbore 74 (FIG. 9) is formed internally in the cavity 18 in the driver 12 (FIG. 2). The counterbore 74 is approximately at the midpoint of the driver 12. A spring 24 is received in the counterbore 74. Preferably, the spring 24 is a wave spring. The spring 24 bears against the sphere 22 which is received in the cavity 18. The counterbore 74 prevents the sphere 22 from over compressing the spring 24. Additional protection against wear or "snagging" of the spring 24 is afforded by insertion of a steel shim or wear disc 76 between the spring 24 and the sphere 22. The wear disc 76 provides a smooth surface for the spherical second end 22 of the driver socket 14.

Figure 28:
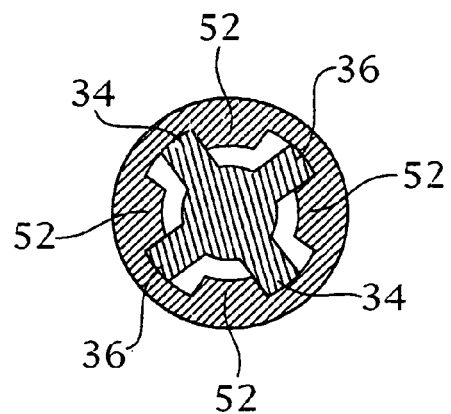
FIG. 28 is a cross-sectional view showing all of the drive webs contacting all of the protrusions.

FIGS. 22–24 show the assembled product with the spherical second end 22 of the driven socket received in the cavity 18 at rest with no applied torque and no angular offset between the driver 12 and the driven socket 14. Under such conditions, the drive webs 34, 36 do not engage the protrusions 52 as shown in FIG. 24. If the driver 12 and the driven socket are maintained with no angular offset and torque is applied, then all drive webs 34 and 36 will ideally make contact with all drive protrusions as illustrated in FIG. 28. FIG. 28 is shown with the driver 12 rotating counterclockwise and imparting rotation on the driven socket 14.

Figure 25:
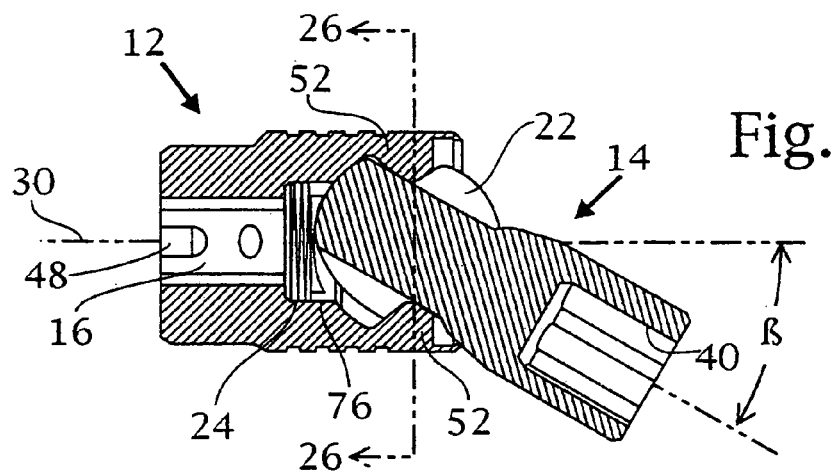
FIG. 25 is a cross-sectional view showing FIG. 23 at an angular offset of the driven socket with respect to the driver.
Figure 26:
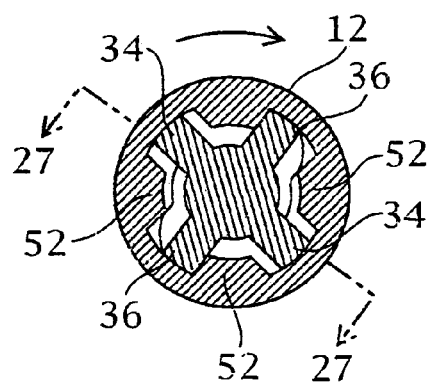
FIG. 26 is a cross-sectional view taken across the lines 26—26 of FIG. 25 with clockwise rotation applied to the driver.
Figure 27:
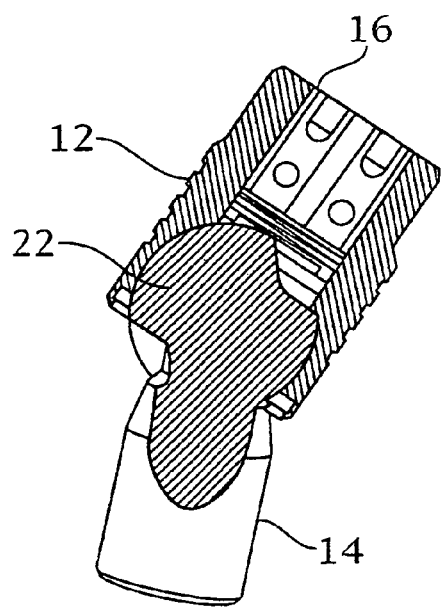
FIG. 27 is a cross-sectional view taken across the lines 27—27 of FIG. 26.

FIGS. 25–27 show the assembly with an angular offset between the driver 12 and the driven 14. At this offset angle changes from 0° to 35°, the web to protrusion contact changes from four locations to two at a time. During rotation of the product while angularly deflected, which webs and protrusions are in contact is continually changing. As illustrated in FIG. 26, only the webs 36 are transmitting the load. However, as the driver continues to rotate, forces on web pair 34 will increase while they decrease on web pair 36. In this manner, all webs and protrusions share the load during a complete rotation, albeit intermittently, regardless of angular deflection.

The protrusions 52 are shaped to provide maximum contact area for given space while simultaneously providing clearance for the driven socket 14 to be deflected approximately 30° from the axis of the driver 12. The torque or impact forces are partly acting outwardly against the entire diameter of the driver 12 rather simply in shear as in a typical impact socket joint of the prior art.

The shape of the channels 32, and the drive webs 34, 36 in the driven socket 14, provide for maximum torque to be transmitted to, and through, the drive webs 34, 36. The typical prior art design has an impact event occurring near an unsupported edge of material on the "ball". For example the slot through a ball on the pinned design causes the pin to hit near a ball slot-edge that is approximately 72° from the sidewall of the slot to the tangent point of the ball. In this invention, the impact occurs against a ball slot-edge that is approximately 105°. Therefore, the edges of the webs are stronger than the typical slotted ball design.

The spring 24 is protected in two ways in the present invention. Primary protection stems from the design of the driver 12. The driver 12 has a counterbore 74 where the spring is installed which communicates with a spherical cavity 18 for the sphere of the driven socket 14. The counterbore 74 and the cavity 18 are arranged in such a manner as to prevent the sphere 22 for over compressing the spring 24. Additional life extending protection to the spring is gained from the choice of what spring to use and the spring design itself. Since the spring characteristics are based on tension and compression rather than torsional shear, as is the case for the typically used coil spring, the amount of compression the spring can see before adversely affecting its life is much greater than that of typical coil springs. While the spring characteristics are not part of the patent, the use of the spring is for this purpose in this product category is unique. The optional wear disc 76 gives additional protection to the spring 24 by insuring that the edges of the drive web 34, 36 do not catch on the spring 24.

A uniqueness of the retaining ring 26 is its ability to minimize the amount of "over travel" required to assemble the product. With a simple round cross section retaining ring, it would be required to press the ball significantly past the ring groove in order to allow the ring to pass between the ball and the upper lip of the ring groove. With the combination of the substantially D-shaped wire and the groove configuration, it is possible to assemble the product with a minimum of over travel. It is believed that minimizing "over travel" is important to maximizing performance.

In the present invention, the driving protrusions 52 that transmit the torque and impact event extend inwardly from a spherical cavity 18 in the driver 12. By doing so, the sphere of the driven socket 14 can be made much larger. By increasing the size of the sphere, it then becomes possible to increase the size of the neck 28 while maintaining the proper sphere to neck ratio for a given angular deflection. Increasing the size of the sphere also provides greater assembly options.

The inwardly extending protrusions 52 also have a unique shape. They have both a conical surface 54 and a flat surface 56. The conical surface provides a tangential contact area for the channels 32 of the driven socket 14 as it rotates at various angular offsets. The flat surface area provides additional bearing surface and shear area when it's needed the most, near maximum angular deflection.

Retaining the components together is done through the use of a specially shaped wire ring that fits into a standard groove cut/formed into the driving member. The wire ring has an outer diameter and two inner surfaces that are flat in order to maintain maximum surface contact and minimize deformation during repeated impact loading.

Additional benefit in the present invention is the protection offered to the spring that maintains relative position of the joint components. In the present invention the spring is recessed in a counterbore. The use of the counterbore prevents the ball from over compressing the spring. In this manner, the present invention is capable of meeting all goals of competitive range of motion, long life, smooth operation, and reliable assembly.

The advantages of the present invention as compared to the prior art are:

Relative to the ball and pin design:
Much greater shear and bearing surface areas available to transmit forces.
Detrimental deformation minimized through better material support and distribution of forces.
Much greater life cycle capability before breakage.
Greater strength.
Longer lasting friction against gravity.
Relative to the quadrified ball (U.S. Pat. No. 4,188,801)
Smoother rotation new.
Longer life of smooth rotation.
Smaller size possible through better distribution of force.
Relative to U.S. Pat. No. 6,152,826.
Capable to exceed competitive benchmarks in both angle and strength without sacrificing assembly integrity.
Greater life cycle through shape and number of protrusions (increase bearing surface).
Relative to other universal joints presently commercially available
Easier of install onto impact wrenches.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A driver to transmit force from a tool to a workpiece, the tool having a square tang with a C-ring circumscribing the square tang, said driver comprising:
   a. a body having a first end, a generally cylindrical second end and a central longitudinal axis extending between said first and said second ends;
   b. a first bore formed in said first end and generally centered about said central longitudinal axis, said first bore having a first end proximate said body first end and a second end distal from said body first end; and
   c. a second bore formed in said generally cylindrical body second end and generally centered about said central longitudinal axis, said second bore having,
      a first bore portion having a first end distal from said body second end and adjacent to said first bore second end, a second end proximate to said second body second end, and a plurality of sidewalls being generally parallel to said central longitudinal axis and defining a generally square cross-section transverse to said central longitudinal axis,
      a generally cylindrical second bore portion having a first end intermediate said first bore portion first end and said first bore portion second end, and a second end proximate to said cylindrical body second end, said generally cylindrical second bore portion having a diameter that is larger than a width across two opposing sidewalls of said generally square first bore portion so that said generally cylindrical second bore portion forms arcuate recesses in each of said plurality of first bore portion sidewalls, and
      a tapered third bore portion intermediate said first bore portion and said generally cylindrical second bore portion, a wall of said tapered third bore portion being angled sufficiently to compress the C-ring on the tool tang when the tool tang is inserted into said second bore.

2. The driver of claim 1, wherein each sidewall of said second bore first bore portion defines a groove proximate to said tapered third bore portion, so that when the square tang is fully received in said driver second bore, said groove receives the square tang C-ring thereby retaining said driver on the tool tang.

3. The driver of claim 2, wherein said groove is formed from a plurality of recesses each defined in a respective one of said plurality of first bore portion walls.

4. A driver to transmit force from a tool to a workpiece, the tool having a square tang with a C-ring circumscribing the square tang, said driver comprising:
   a. a body having a first end, a generally cylindrical second end and a central longitudinal axis extending between said first and said second ends;
   b. a first bore formed in said first end and generally centered about said central longitudinal axis, said first bore having a first end proximate said body first end and a second end distal from said body first end; and
   c. a second bore formed in said generally cylindrical body second end and generally centered about said central longitudinal axis, said second bore having a plurality of sidewalls generally parallel to said central longitudinal axis that define a generally square cross-section transverse to said central longitudinal axis, each sidewall having a first end adjacent to said first bore second end and a second end proximate to said body second end, wherein each second bore sidewall second end defines an arcuate recess therein such that said second bore wall second end recesses together define a third bore, said third bore having
      a first end intermediate said second bore sidewall first ends and said second bore sidewall second ends,
      a second end opening to said body second end,
      a generally circular cross-section transverse to said central longitudinal axis and generally concentric with said second bore, and
      a tapered transition portion intermediate said third bore first end and said generally square second bore, said tapered transition portion being angled sufficiently to compress the C-ring on the tool tang when the tool tang is inserted into said cylindrical body second bore.

5. The driver of claim 4, wherein each sidewall of said second bore defines a groove proximate to said tapered transition portion, so that when the square tang is fully received in said driver second bore, said groove receives the square tang C-ring thereby retaining said driver on the tool tang.

6. The driver of 4, wherein said first bore is a generally semi-spherically shaped cavity generally centered about said central longitudinal axis, said generally semi-spherical cavity defining a plurality of equi-spaced apart protrusions, said protrusions extending radially inward from said semi-spherical cavity toward said central longitudinal axis.

7. A driver to transmit force from a tool to a workpiece, the tool having a square tang with a C-ring circumscribing the square tang, said driver comprising a body having a. a first end, a generally cylindrical second end and a central longitudinal axis extending between said body first end and said body second end;
b. a first face transverse to said central longitudinal axis, said first face being defined by said body first end,
c. a second face transverse to said central longitudinal axis, said second face being defined by said body second end,
d. a first bore formed in said first end and generally centered about said central longitudinal axis, said first bore having a first end opening into said body first end and a second end distal from said body first end; and
e. a second bore formed in said generally cylindrical body second end and generally centered about said central longitudinal axis, said second bore having, a plurality of sidewalls generally parallel to said central longitudinal axis that define a square cross-section transverse to said central longitudinal axis, each sidewall having a first end adjacent to said first bore second end and a second end proximate to said body second end,
wherein each second bore sidewall defines an arcuate recess therein, said recesses being defined by a radius of curvature greater than one-half of a width across two opposing sidewalls of said second bore, said radius of curvature originating from said central longitudinal axis, each said arcuate recess having
a first end intermediate said sidewall first end and said sidewall second end,
a second end opening into said body second face, and
a tapered transition portion intermediate said recess first ends and said second bore sidewalls, said tapered transition portion being angled sufficiently to compress the C-ring on the tool tang when the tool tang is inserted into said second bore.

8. The driver of claim 7, wherein each sidewall of said second bore defines a groove proximate to said tapered transition portion, so that when the square tang is fully received in said driver second bore, said groove receives the square tang C-ring thereby retaining said driver on the tool tang.

9. The driver of 7, wherein said first bore is a generally semi-spherically shaped cavity generally centered about said central longitudinal axis, said generally semi-spherical cavity defining a plurality of equi-spaced apart protrusions, said protrusions extending radially inward from said semi-spherical cavity toward said central longitudinal axis.

* * * * *